ated Feb. 8, 1966

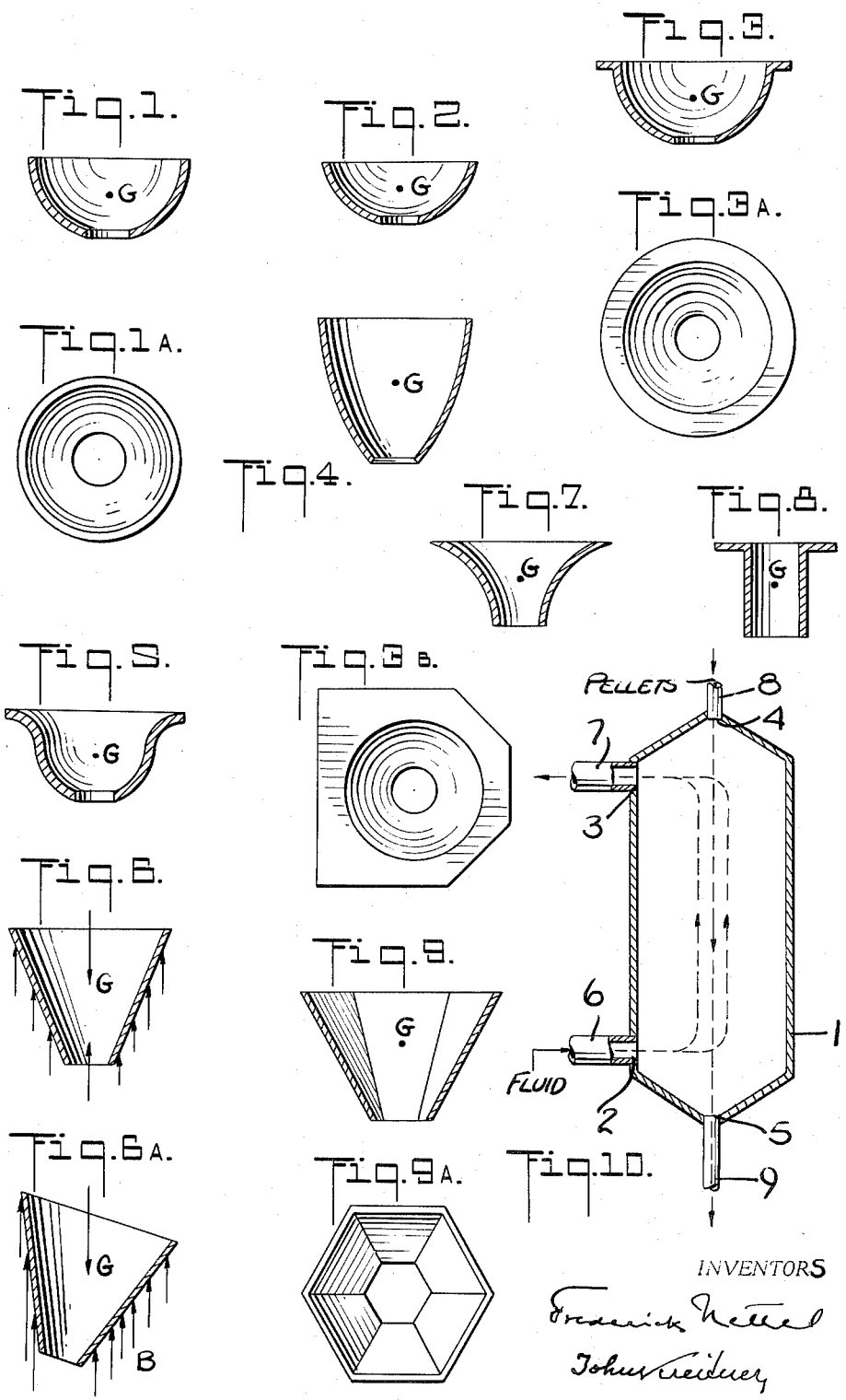

3,233,660
HEAT EXCHANGER USING SPECIAL PELLETS OF SHEET METAL
Frederick Nettel, 173 Chapel Road, Manhasset, N.Y., and John Kreitner, 52 Brixton Road, Garden City, N.Y.
Filed Nov. 27, 1962, Ser. No. 240,351
5 Claims. (Cl. 165—4)

This is a continuation-in-part of our co-pending application Ser. No. 207,322 filed July 3, 1962.

This invention deals with comminuted solid bodies (pellets) used to transfer heat from or to a fluid stream of gas, vapor or liquid by contact with said fluid, in particular from or to fluids in relative motion to said comminuted bodies.

It is known to use a multitude of such bodies called pellets for the purposes of this specification for heat transfer. Known materials include metals, carbides, ceramics, stones, glass, for example, in shapes from irregular granules to spheres of more or less equal size. Also tubular cuts (Raschig rings), and flat pieces of circular or other shapes are known.

Non-metallic pellets are subjected to abrasion during handling and to breakage if subjected to thermal shocks which is not acceptable for many purposes. They are also difficult to manufacture in uniform sizes to close tolerances in dimensions and weights.

As long as the pellets are at rest or moving slowly in packed condition their particular shape is unimportant and their size is only important in that a high ratio or surface to weight is desired. These conditions change radically if both pellets and the fluid, from or to which heat is to be transferred, move with substantial velocities, for example, with the pellets falling individually under the influence of gravity in counterflow to a rising stream of gas. Good heat transfer requires not only large contact surfaces but also sufficient time (retention time). Besides, it is for economic reasons desired to effect heat transfer at low and preferably constant gas velocities i.e. with small pressure losses in the gas stream.

It is known to reduce the fall velocity of conventional pellets by the action of an upward gas stream impinging on their surface. In this case the shape of the individual pellets, if of granular nature, is of secondary importance. It is, however, important to reduce their terminal velocity, viz., that relative velocity of fluid and pellets at which the upward drag equals the pellet weight. This consideration leads to the use of materials of small density, such as specific gravity in the range of 2 to 4 (with water as 1). Carbides, mullite and aluminum oxyde in sintered form have been proposed. The use of light metals such as aluminum or magnesium is restricted due to their low melting points and proneness to oxydization and corrosion.

It is the principal object of this invention to provide pellets made of material of high specific gravity which nevertheless attain low terminal velocity due to their special shape. It is a further object of this invention to avoid by the use of such materials abrasion, corrosion and breakage due to heat shock.

It is known to use hollow spheres made of thin sheet metal. Such spheres are for economic reasons (cost of production) impractical, especially if it is remembered that for heat exchange operations even of moderate size, millions of such spheres are required.

It is another object of this invention to provide pellets which can be economically mass-produced within close tolerances of weight and shape.

These and other advantages will become clear from the following description, taken together with the drawing which show in diagrammatic form embodiments of the invention by way of non-limiting examples.

In the drawings:

FIG. 1 shows a sectional view of a semi-spherical pellet of sheet metal with a central hole and FIG. 1a is a view from the top. The center of gravity is marked G.

FIG. 2 depicts a sectional view of a pellet of spherical segment shape also with central hole.

FIG. 3 is a sectional view of a pellet as per FIG. 2 but with a flat peripheral flange at the upper rim. FIG. 3a is a view of this pellet from above. FIG. 3b illustrates a view from above on a pellet with quadratic and hexagonal shaped collars.

FIG. 4 indicates in sectional view a pellet of near-paraboloid shape.

FIG. 5 depicts a cross section of a pellet spherical shape with outwardly curved collar.

FIG. 6 illustrates a sectional view of a pellet of frusto-conical hollow shape while FIG. 6a shows the same in inclined position.

FIG. 7 depicts in section a similar hollow body in the form of a part of a toroid.

FIG. 8 indicates a section through a pellet combining a flat circular collar with a centrally attached hollow cylindrical portion.

FIG. 9 shows a form similar to the FIG. 6 but with the circular cone replaced by a hexagonal frusto-pyramid. FIG. 9a represents a view from the top on a pellet as per FIG. 9.

FIG. 10 shows diagrammatically in vertical cross section a heat exchanger for using hollow metal pellets.

The principal object of this invention is achieved by providing pellets of thin sheet metal and so formed into hollow shapes that the center of gravity of the metal lies at a comparatively substantial distance relative to the size of the pellet from the plane of the wider rim, and by providing an opening at the narrow end of the pellet.

The location of the center of gravity required by this invention is obtained by making the height of the pellet i.e. the maximum dimension in the direction of its axis not less than twenty percent of the largest width of the pellet plus the thickness of the material.

Another object of this invention is attained by using sheet metal having resistance to heat shock, abrasion, oxydization and corrosion at high temperatures.

A further object of this invention is achieved by using sheet metal of a thickness not larger than ten percent of the largest width of the pellets.

Still another object of this invention is realized by providing an opening at the bottom of the pellets not larger than one half of the largest width of the pellets.

Still further objects of this invention are realized by making the pellets of basically spherical, parabolic or conical forms with or without flanges as shown in the drawings.

Experiments by the applicants have shown that all the illustrated forms of pellets fall in a fluid with the part of largest diameter always on top and the smaller central holes at the bottom. This remarkable stability results from the fact that their center of gravity is located below the plane of the upper rim. It should be mentioned at this point that this stability also exists for pellets without openings at the lower end. The reasons for and advantages of providing these openings will be explained as this specification proceeds.

The self-stabilization effect may be illustrated for a frusto-conical pellet as per FIG. 6. The distribution of the forces acting on the pellet in normal falling position, created by the upwardly flowing fluid, are shown in FIG. 6a.

In this position the downward force resulting from the weight of the pellets passes through the center of gravity G. Opposing it are the upward forces created by the fluid symmetrically distributed over the lower surface of the cone with a resultant B passing through the central axis of the pellet directly opposing the gravity force through G. The pebble is in equilibrium. The stability of this equilibrium follows from considering a disturbance in position. If an external force moves the pellet into an inclined position, for example to the right, as shown in FIG. 6b, the situation changes radically. While the weight force is of course still passing through the center of gravity, the forces from the fluid are now concentrated to the right with the resultant B to the right of G. As can be seen, the forces G and B form a righting moment (similar to that acting on a rolling surface ship) bringing the pellet back to its original position, in which the greatest frontal area is exposed to the fluid flow and therefore the greatest retarding force (drag) is exerted on the pellet. Frusto-conical pellets according to FIG. 6 and the similar forms depicted in FIGS. 4 and 7 show for geometric reasons fast increases of the righting moment with pellet inclination and thus are presently preferred.

Experiments by the applicants also show that, while pellets of semi-spherical (FIG. 1) of spherical-segment (FIG. 2) forms show great stability in descent, they may not show the slowest descent over a given height for pellets of the same diameter and weight. It can be shown that a combination of various shapes with planes, as shown in FIGS. 3, 3a, 3b, or FIG. 5 by way of examples, result in more or less zig-zag descent of smaller average downward velocity. The frequency of the zig-zag movement has been found to decrease with the width of the collar. The stability of these pellets remains sufficient for many practical purposes.

Pellets as shown in FIG. 8, while having openings of same size at both ends, meet the requirements as to the location of the center of gravity and consequently as to stability and therefore are within the scope of this invention.

With respect to terminal velocity, a thin-walled hollow shape behaves like a solid sphere of much smaller density. For example, a semi-spherical steel shell of a thickness of $\frac{1}{20}$ of the diameter has a terminal velocity equal to that of a solid sphere of only about 1.4 density.

With regard to heat transfer, the semi-spherical pellet without center hole has an effective surface of more than 50% of that of a solid sphere of the same diameter, but weighs only 40% of a corundum sphere, and has a heat stoppage capacity of only 20% of that of a corundum sphere, resulting in correspondingly quicker heat transfer (reduced retention time). The pellets according to this invention are all provided with a central hole at what is during the fall of the pellets their lowest point. This hole, which is preferably smaller than one half of the largest pellet width, changes the location of the center of gravity of the pellet and its stability very little, compared with a similar pellet without such hole.

However, the provision of such hole results in the following advantages:

(a) Some fluid will flow through the hole and along the inner surface of the pellet, thereby materially improving the heat transfer;

(b) This flow will have a wiping action on the inner pellet surface which will tend to reduce or eliminate the possibility of accumulation of contaminants carried by the fluid.

Reverting in more detail to FIG. 10 showing a heat exchanger for using the special pellets described above, in which 1 is a closed upright chamber with a first opening 2 near its bottom for fluid inlet, a second opening 3 near its top for fluid outlet. A third opening 4 at the top of the chamber serves to receive pellets while a fourth opening 5 is for discharging pellets from the bottom of the chamber 1.

The openings 2 and 3 are connected to conduits 6 and 7, while the opening 4 and 5 are connected to the pellet pipes 8 and 9 as shown.

Assuming that the heat exchanger is to serve as air heater, a stream of hot pellets is introduced into the chamber 1 through the pellet pipe 8 and is permitted to fall through the chamber distributed over the chamber cross section by conventional means known per se. The pellets accumulate near the opening 5 through which they are discharged via the pellet pipe 9.

At the same time cool fluid is introduced via the conduit 6, flowing upwards through the chamber and leaving via the conduit 7. Within the chamber pellets and fluid are in counterflow, exchanging heat so that the air is heated while the pellets reach the opening 5 in cooled condition. Due to the special shape of the pellets they act as individual miniature parachutes, falling relatively slowly thereby increasing their residence time within the chamber, thereby achieving efficient heat exchange with a chamber of low height.

Naturally, it is possible to use the same type of chamber, known per se, for heating pellets by a hot fluid in counterflow to the pellets.

The core of this invention lies in the use of hollow metal pellets as described above, which are self-stabilizing during their free fall, resulting in new and unique effects, making highly efficient and economic operation of pellet-type heat exchangers possible.

For economic reasons it is important to keep the costs of pellets as low as possible, especially since many millions of pellets may be needed for a heat exchanger of a given capacity. The pellets according to this invention can be easily stamped out of thin sheet material or tubular material and pressed into the required shapes.

Stainless or other alloyed steel is the presently preferred material for the pellets in spite of its higher price per ton. This is more than compensated by resistance to breakage by heat shock, and to abrasion, oxydization and corrosion when exposed to combustion gases or other gases containing for example acids or vanadium pentoxyde, resulting in a very long service life.

While the pellets shown in FIGS. 1 to 8 are all rotational bodies, this invention is not restricted to these shapes. Pellets of other than circular cross-sectional area may be used. An example is shown in FIG. 9 in which the pellet is of frusto-pyramidal form of hexagonal cross section. Such and similar other forms are also easily formed from sheet material.

It is immaterial for the purposes of this invention in what particular type and design of heat exchanger the pellets are used, what kind of fluids are processed therein and at what temperatures the pellets have to work.

Having now described and illustrated embodiments of the invention, we wish it to be understood that our invention is not limited to the specific forms and arrangements hereinbefore described and shown, or specifically covered by the claims.

What we claim is:

1. In a heat exchanger wherein a multitude of pellets fall in counterflow to a rising fluid stream at a temperature different from that of the pellets, including a closed upright chamber having a first opening near its bottom for receiving a stream of said fluid, a second opennig near its top and for discharging said fluid, a third opening near its top for receiving a stream of pellets, a fourth opening at its bottom for discharging said stream of pellets, first conduit means for leading said fluid into the said first opening, second conduit means for discharging the fluid stream from said second opening after it has passed through said chamber in upward direction, first pellet pipe means for leading a stream of pellets from a source into the said third opening, second pellet pipe means for leading the said stream of pellets after it has passed under gravity at least partly in free fall through the said chamber, the improvement of employing pellets of sheet metal and of hollow shapes symmetrical about one axis, with one end larger than the other and with two openings of different sizes at opposite ends of said axis, the larger opening being at the larger end and with any section intermediate the ends not exceeding the dimension of the larger end, the maximum dimension of the pellets in the direction of said axis being not less than twenty percent of the largest diameter of the pellets plus the thickness of the sheet material used, so that the pellets, as they drop freely through the rising fluid, will orient themselves automatically with the smaller ends facing the rising fluid stream.

2. A heat exchanger as set forth in claim 1, employing pellets of sheet metal of a thickness not larger than ten percent of the largest diameter of the pellets.

3. A heat exchanger as set forth in claim 1, employing pellet having their smaller openings not larger than one half of the size of the larger openings.

4. A heat exchanger as set forth in claim 1, employing pellets having peripheral flanges extending outwardly from the pellets at their largest diameter.

5. A heat exchanger as set forth in claim 1, employing pellets made of tubular pieces of sheet metal, one end of which is flared to form a peripheral flange extending outwardly from the tubular part, said tubular part having a length not less than twenty percent of the diameter of said peripheral flange, so that the pellets, as they fall freely through the rising fluid stream, orient themselves automatically with the flanged ends uppermost.

References Cited by the Examiner

UNITED STATES PATENTS

| | | | |
|---|---|---|---|
| 1,614,387 | 1/1927 | Pereda | 165—107 |
| 2,591,497 | 4/1952 | Berl | 261—95 |
| 3,117,625 | 1/1964 | Fraenkel | 165—185 |

FOREIGN PATENTS

| | | |
|---|---|---|
| 534,816 | 1/1922 | France. |
| 431,309 | 7/1935 | Great Britain. |
| 445,045 | 4/1936 | Great Britain. |

ROBERT A. O'LEARY, *Primary Examiner.*

CHARLES SUKALO, *Examiner.*